United States Patent Office 3,294,820
Patented Dec. 27, 1966

3,294,820
PROCESS FOR PREPARING HALOMETHYL VINYL KETONES
Robert F. Hudson and Pierre-Antoine Chopard, Geneva, Switzerland, assignors to American Cyanamid Company, Stamford, Conn., a corporation of Maine
No Drawing. Filed Mar. 4, 1963, Ser. No. 262,326
14 Claims. (Cl. 260—347.8)

This invention relates to a process for preparing halomethyl vinyl ketones.

Halomethyl vinyl ketones have heretofore been prepared by the direct halogenation of methyl vinyl ketones, by the action of diazomethane on vinyl acyl halides, and by the addition of halogenated acyl halides to acetylene and ethylene derivatives in the presence of aluminum trichlorides.

These methods of preparation of this class of compound involve technical difficulties and frequently produce low yields. In addition, specific methods are only useful for preparing selected compounds of the general class.

Accordingly, it is an object of the present invention to provide a simple, direct and general process for preparing halomethyl vinyl ketones in acceptable yields.

This and other objects and advantages of the present invention will become more apparent from the detailed description thereof set forth hereinbelow.

In accordance with the present invention, a process is provided for preparing halomethyl vinyl ketones of the formula $$R^1-CH=CR^2-\overset{O}{\underset{\|}{C}}-CH_2X$$

where $R^1$ is an organic radical more specifically, the residual organic radical of an aldehyde, said radical being free of groups which react preferentially with the labile hydrogen of the product, $R^2$ is H or an organic radical such as $CH_3$ and phenyl, and X is halogen, which comprises reacting a novel phosphorane of the formula $$R_3P=CR^2-\overset{O}{\underset{\|}{C}}-CH_2X$$

where R is an organic radical such as alkyl, aryl, aralkyl and alkaryl, $R^2$ is as identified above, and X is as identified above, with an aldehyde.

Typically, the total synthesis is carried out in three steps. The equations which demonstrate this synthesis are set forth hereinbelow.

(1) 

(2) 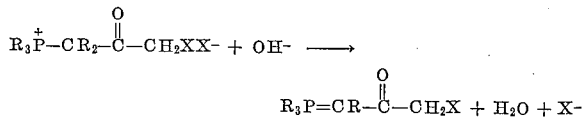

(3) 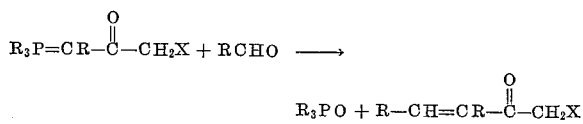

In the above equations the R's are H or organic radicals, to be illustratively described more fully hereinafter, and X is halogen, particularly chlorine and bromine.

In carrying out the reaction of Equation 1, a suitable phosphine is reacted with a suitable dihalo ketone in a suitable reaction solvent such as dimethyl ether, diethyl ether, dimethyl ether of ethylene glycol, diethyl ether of ethylene glycol, and tetrahydrofuran. In addition, nitromethane and various non-polar solvents, as for example benzene and toluene, may be employed. These solvents or their equivalents are such that the phosphonium intermediate resulting from the reaction illustrated in Equation 1 is precipitated out of solution therein.

Suitable phosphines within the contemplation of the present invention would include, among others, the trialkyl phosphines, the triaryl phosphines, the triarylalkyl phosphines, trialkaryl phosphines, and their various substituted derivatives. Typically, the phosphines would include triethyl phosphine, tributyl phosphine, triphenyl phosphine, diethyl phenyl phosphine, and the like.

The dihalo ketones employable in the present invention are preferably symmetrical dihalo ketones such as dihalo acetone and more specifically dichloro acetone. In instances where $R^2$ is other than hydrogen, suitable dihalo ketones contemplated for use in this invention include chloromethyl α-chloroethyl ketone, chloromethyl α-chlorobenzyl ketone, and the like.

The phosphonium halides resulting from the reaction of Equation 1 are then reacted with a suitable alkali metal hydroxide including sodium, potassium and lithium hydroxide, ammonium hydroxide, alkaline earth metal oxides, hydroxides and carbonates, organic alkalis such as methyl alcoholate, lithium methoxide, and the like.

The reaction between the phosphonium halides and a suitable base produces a novel class of intermediate phosphoranes. The production of these phosphoranes and their subsequent reaction with an aldehyde constitutes the principal process aspect of the present invention. Thus, the novel phosphoranes permit the preparation of halomethyl vinyl ketones in acceptable yields by a general reaction. The fact that this synthesis is feasible is surprising, since the α-halogen atom in the betaine would be expected to epoxidize by analogy with ethylene chlorhydrin or self-polymerize, depending upon the electronic structure of the phosphorane or betaine.

The aldehyde to be reacted with the phosphorane may, insofar as we are aware, be any aldehyde, with the exception of those which will contain an additional group which reacts preferentially with the labile halogen of the product. Thus, the aldehyde may be an alkyl aldehyde such as acetaldehyde, propionaldehyde, butyraldehyde, and their substituted derivatives, such as lauric aldehyde, chloral; the cycloalkyl aldehydes, such as hexahydro benzaldehyde; the aryl aldehydes such as benzaldehyde, anthraldehyde and the substituted derivatives such as nitro benzaldehyde; alkaryl such as cinnamaldehyde and their substituted derivatives such as amyl cinnamaldehyde; heterocyclic aldehydes such as furfural; and the like.

The reactions of Equations 1, 2 and 3 may be carried out by employing the reactants therein described in stoichiometrically equal amounts, though excesses of one or the other may be employed. In most cases, it was found convenient to employ the aldehyde in excess in the reaction set forth in Equation 3.

The Equations 1–3 above are normally carried out at temperatures of from 0 to 180° C., though preferably are carried out at temperatures of from 25 to 100° C. at atmospheric pressure. While normally the reaction will be carried out at atmospheric pressure, it may be carried out at subatmospheric and superatmospheric pressures.

In order to more fully illustrate the present invention, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

*Equation 1.—Preparation of triphenyl chloracetonylphosphonium chloride*

A mixture of triphenylphosphine (100 grams, 0.38 mole) and α, γ-dichloracetone (48.2 grams, 0.38 mole) dissolved in 200 ml. of tetrahydrofuran was heated under reflux for 4 hours with agitation. After cooling the reaction mixture, colorless crystals, 127 grams (85%) M.P. 177–8° were collected. The product was pure enough for further treatment. The analytical sample was purified by dissolving it in warm methanol and precipitating it with ethyl acetate. M.P. after 3 purifications 210–12° dec.

*Analysis.*—Calcd. for $C_{21}H_{19}Cl_2OP$: C, 64.45; H, 4.92; Cl, 18.24; P, 7.96. Found: C, 64.45; H, 4.94; Cl, 17.91; P, 7.74.

The phosphonium salt easily formed a hydrate when dissolved in methanol and reprecipitated by water. M.P. 74° from methanol-water.

*Analysis.*—Calcd. for $C_{21}H_{19}Cl_2OP \cdot H_2O$: C, 62.1; H, 5.32; Cl, 17.4; P, 7.6. Found: C, 62.5; H, 5.21; Cl, 17.2; P, 6.8.

*Equation 2.—Preparation of triphenyl chloracetonyl phosphorane*

To triphenyl chloracetonyl phosphonium chloride, 260 grams (0.62 mole) dissolved in 300 ml. methanol, a solution of sodium carbonate 35 grams (0.31 mole) in 200 ml. of water was added rapidly with stirring. The mixture was then diluted with 2–3 volumes of water and allowed to stand for 20–30 minutes. The white precipitate, 215 grams (92%) was then collected and dried in air. M.P. 179–180°.

*Analysis.*—Calcd. for $C_{21}H_{18}ClOP$: C, 71.5; H, 5.10; Cl, 10.1; P, 8.8; M.W., 352.5. Found: C, 71.8; H, 5.18; Cl, 10.1; P, 8.5; M.W., 359.

*Equation 3.—Preparation of chloromethyl vinyl ketones*

The illustrative phosphorane prepared as described above was reacted with the aldehydes with agitation according to the conditions defined in Table I hereinbelow. No solvents were employed with volatile aldehydes. Otherwise, benzene or toluene were employed. After completion of the reaction the solvent is distilled off and the phosphine oxide formed is precipitated by the addition of cyclohexane. The precipitates were extracted repeatedly with cyclohexane and distillation of the extracts furnished the product. When separation of the phosphine oxide was omitted, slightly lower yelds were obtained.

TABLE I

| | Reaction Conditions | | | | Products | | | |
|---|---|---|---|---|---|---|---|---|
| Aldehyde R—CHO—R— | Equivalents of aldehyde used | Time, Hrs. | Temperature, °C. | Percent Yield [a] | M.P. or B.P.,[b] °C./mm. | | Percent Calcd. | Percent Found |
| I — phenyl (C₆H₅) | 5 | 72 | 80 | 30 | 60°[c] 114°/.001 | | C, 66.6; H, 5.33; Cl, 19.6; MW, 180.6 | C, 66.8; H, 5.11; Cl, 17.1.[d]; MW, 150. |
| II — O₂N-C₆H₄- | 1.25 | 3 | 80 | 79 | 116° (Toluene) | | C, 53.2; H, 3.59; Cl, 15.75; O, 21.3; MW, 225.6 | C, 53.6; H, 3.60; Cl, 15.28; O, 21.6; MW, 208. |
| IV — $CH_3$-C(O)-NH-C₆H₄- | 2 | 3 | 100 | 33 | 232° (DMF) | | C, 60.9; H, 5.08; Cl, 14.95; N, 5.90 | C, 60.83; H, 4.96; Cl, 14.84; N, 6.02. |
| V — n-Butyl- | 5 | 12 | 25 | 26 | 87–90°/10 | | C, 57.3; H, 7.55; Cl, 24.2; O, 10.9; MW, 146.6 | C, 57.7; H, 7.83; Cl, 23.5.[d]; O, 11.1; MW, 152. |
| VI — $Cl_3C$— | 10 | 3 | 25 | 44 | 50/52°/.01 | | C, 27.2; H, 1.82; Cl, 63.9 | C, 27.21; H, 1.95; Cl, 63.74. |
| VII — furyl | 10 | 0.5 | 90 | 48 | 51–3°($H_2O$-EtOH) 100°/.02. | | C, 56.40; H, 4.13; Cl, 20.80 | C, 56.47; H, 4.07; Cl, 20.87. |

[a] Yields after one distillation or crystallization.
[b] Uncorrected.
[c] Litt. 62°; 138°/5 mm.
[d] Chlorine analysis was somewhat low due to the high reactivity of the compounds.

EXAMPLE 2

*Equation 1.—Preparation of triphenyl cinnamylmethyl phosphonium chloride*

Triphenyl phosphine, 5.2 grams (0.02 mole) and chloromethyl styrylketone, 3.6 grams (0.02 mole) dissolved in 25 ml. of tetrahydrofuran were heated under reflux for 3 hours. Evaporation of ¾ of the solvent and addition of ethyl acetate precipitated 2.8 grams (32% of the crude phosphonium chloride M.P. 184–6°. This was recrystallized from a mixture of ethanol (5%) in ethyl acetate M.P. 200–202°.

*Analysis.*—Calcd. for $C_{28}H_{24}ClOP$: Cl, 8.02; P, 7.00. Found: Cl, 8.69; P, 7.14.

*Equation 2.—Preparation of triphenyl cinnamylmethylene Phosphorane*

To triphenylcinnamylmethyl phosphonium chloride, 2.5 grams (0.0056 mole) dissolved in 25 ml. methanol were added a water solution of 0.3 gram sodium carbonate. The mixture was diluted with 3–4 volumes of water and allowed to stand for about one hour. The microcrystalline yellowish material was then collected and recrystallized twice from monoglyme. Yield 0.8 gram (32%); M.P. 99–102°.

*Analysis.*—Calcd. for $C_{28}H_{23}PO$: P, 7.63. Found: P, 7.66.

The triphenyl cinnamylmethylene phosphorane prepared as above may be employed in preparing styryl vinyl ketones.

While some of the above yields appear to be low, this is believed to be most probably the result that polymerization of the product does occur to some extent. In this regard, the polymerization may be prevented by the inclusion of polymerization inhibitors in accordance with the knowledge of those skilled in the art.

The halovinyl ketones prepared in accordance with this invention are highly toxic and demonstrate biological activity. They are useful as fungicides and insecticides and are useful in the preparation of polymers and dyes. In the preparation of polymers, they may be homopolymerized or copolymerized with such monomers as acrylonitrile, methyl methacrylate, employing conventional free radical initiators and subsequently reacted with amines to impart improved dyeability to the copolymer.

We claim:

1. A process for preparing a halomethyl vinyl ketone of the formula $$R^1-CH=CR^2-\overset{O}{\underset{\|}{C}}-CH_2X$$

where X is halogen, $R^1$ is a residual organic radical of an aldehyde, said radical being free of groups which react preferentially with the labile halogen of the product, $R^2$ is selected from the group consisting of H, $CH_3$ and phenyl, which comprises reacting a phosphorane of the formula $$R_3P=CR^2-\overset{O}{\underset{\|}{C}}-CH_2X$$

where R is selected from the group consisting of lower alkyl, aryl, arylalkyl and alkaryl and $R^2$ and X are as identified above, with an aldehyde of the type specified above.

2. A process for preparing a halomethyl vinyl ketone of the formula $$R^1-CH=CH-\overset{O}{\underset{\|}{C}}-CH_2-X$$

where X is halogen, $R^1$ is a residual organic radical of an aldehyde, said radical being free of groups which react preferentially with the labile halogen of the product, which comprises reacting a phosphorane of the formula $$R_3P=CH-\overset{O}{\underset{\|}{C}}-CH_2X$$

where R is selected from the group consisting of lower alkyl, aryl, arylalkyl and alkaryl and X is as identified above, with an aldehyde of the type specified above.

3. A process for preparing a chloromethyl vinyl ketone of the formula $$R^1-CH=CH-\overset{O}{\underset{\|}{C}}-CH_2Cl$$

where $R^1$ is a residual organic radical of an aldehyde selected from the group consisting of lower alkyl aldehydes, lauric aldehyde, chloral, hexahydro benzaldehyde, benzaldehyde and furfural, which comprises reacting a phosphorane of the formula $$R_3P=CH-\overset{O}{\underset{\|}{C}}-CH_2Cl$$

where R is selected from the group consisting of lower alkyl and phenyl, with an aldehyde from the group specified above.

4. A process according to claim 3 in which the aldehyde is benzaldehyde.

5. A process according to claim 3 in which the aldehyde is p-nitro benzaldehyde.

6. A process according to claim 3 in which the aldehyde is p-acetamido benzaldehyde.

7. A process according to claim 3 in which the aldehyde is caproaldehyde.

8. A process according to claim 3 in which the aldehyde is chloral.

9. A process according to claim 3 in which the aldehyde is furfurylaldehyde.

10. A process according to claim 3 which is carried out at a temperature of from about 0 to about 180° C.

11. A process according to claim 3 in which the reactants are employed in stoichiometric amounts.

12. Triphenyl chloracetonyl phosphorane.

13. A phosphorane of the formula $$R_3P=CH-\overset{O}{\underset{\|}{C}}-CH_2X$$

where R is selected from the group consisting of lower alkyl, aryl, aralkyl, and alkaryl and X is halogen.

14. A phosphorane of the formula $$R_3P=CH-\overset{O}{\underset{\|}{C}}-CH_2X$$

where R is selected from the group consisting of phenyl and lower alkyl and X is halogen.

References Cited by the Examiner

UNITED STATES PATENTS 2,425,269   8/1947   Seymour et al. _____ 260—590
2,879,304   3/1959   Isler et al. _____ 260—590

FOREIGN PATENTS 1,271,752   8/1961   France.

OTHER REFERENCES

Arbuzov et al.: Chem. Abstracts, 51, 9503¹ (1957).

LEON ZITVER, *Primary Examiner.*

DANIEL D. HORWITZ, *Examiner.*